UNITED STATES PATENT OFFICE.

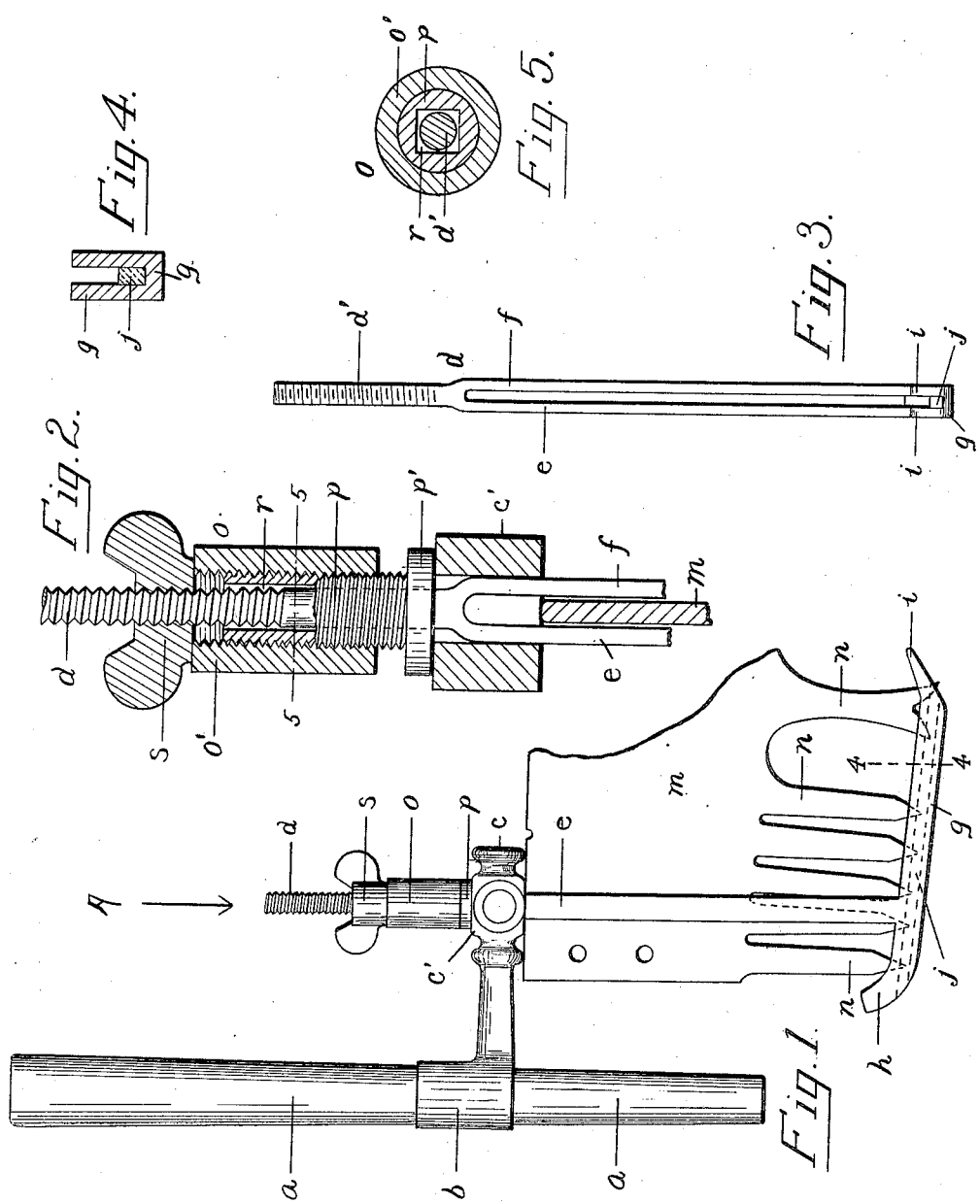

NICHOLAS R. RASHFORD, OF LA CENTER, WASHINGTON.

ADJUSTABLE HANDLE FOR CROSSCUT-SAWS.

1,070,628.

Specification of Letters Patent.     Patented Aug. 19, 1913.

Application filed August 9, 1912.   Serial No. 714,301.

*To all whom it may concern:*

Be it known that I, NICHOLAS R. RASHFORD, a citizen of the United States, and a resident of La Center, county of Clarke, and State of Washington, have invented a new and useful Improvement in Adjustable Handles for Crosscut-Saws, of which the following is a specification.

This invention relates to adjustable saw handle and particularly to that type of handle adapted for use on a drag or crosscut saw.

The purpose of my invention is to provide an improved handle which may be applied to the saw blade without remodeling the latter in any way, such as by breaking out teeth or filing between same, also to avoid inconvenience of any undue work in the adjustment of the handle, at the same time providing for a firm grip of the handle of the saw blade; in fact providing a handle of more rigid structure than the ordinary saw handles heretofore used.

In the drawings accompanying this specification: Figure 1 is a side elevation of a portion of a cross-cut saw with my improved handle applied thereto; Fig. 2 is a partial vertical sectional view on a line pointed by the arrow $a$ in Fig. 1, of the devices by which the saw blade is clamped in place; Fig. 3 is an end elevation of the tang in which the end of the saw is held; Fig. 4 is a section on a line 4—4 of Fig. 1, drawn to a larger scale, looking toward the left; and Fig. 5 is a section on the line 5—5 of Fig. 2, illustrating the way in which the adjustable washer has a free movement on the threaded end of the tang.

The saw handle or hand gripping portion, $a$, is fixed in a sleeve $b$, formed with a perpendicularly extending arm $c$, provided with a socket head adapted to receive a tang $d$. Said tang is made with a threaded portion $d'$ and a slotted portion composed of legs, $e, f$, joined at their lower ends by an integral guard $g$ extending in the direction of the saw-blade and being adapted for engaging simultaneously a plurality of saw-blades. This guard, $g$, is channeled out, as shown in Fig. 4, the width of this channel being equal to the width of the space between the legs $e, f$. The rear and front ends of this guard are turned up, as indicated at $h$ and $i$, respectively. A filling, $j$, of some soft metal is put in the channel of the guard $g$, so that when the saw is placed in position, as shown in Fig. 1, its end being held in between the legs, $e, f$, the saw-teeth, $n$, will bear on such filling, $j$, the latter preventing wear or injury of the saw-teeth but at the same time provides an effective gripping or bearing surface for the saw-teeth. On the threaded shank-end $d'$ of the tang $d$ I place a longitudinally extensible sleeve $o$, and a wing-nut $s$. Such wing nut, $s$, will, when rotated, draw the back of the saw-blade firmly against the under side of the arm $c$, and thus clamp the handle securely on the saw-blade. The washer, $o$, is composed of a main part $o'$ and a thimble $p$, as shown in Fig. 2. Said main member is threaded internally and the thimble externally, and the latter is made with an abutment collar $p'$. The thimble $p$ has a smooth-faced bore, preferably of square cross-section, as shown at $r$ in Fig. 5, which allows said washer to be freely moved up and down over the threaded end $d'$ of the tang $d$.

When the wing-nut, $s$, is rotated so as to draw the tang up, for clamping the heel of the saw blade in place, the teeth of the saw blade will be forced into the soft metallic filling, $j$, and the saw handle will in consequence be rigidly secured on the saw blade as mentioned. Also, when the saw is being dragged over the ground, the guard $g$ will serve as a protection for said teeth.

The advantages of my device are apparent. When it is desired to affix my saw handle to the heel of a blade, or to remove the saw blade from the handle, it is only necessary to turn the wing-nut $s$, a little, in order to release the blade. This feature is realized by virtue of the fact that the device holds the saw blade by the points of its teeth instead of between the teeth as in the old device. The adjustable washer $o$ furthermore eliminates the necessity of carrying special washers to be used for different saws, for the washer $o$ can be adjusted to the width of any saw blade.

I claim:

A saw handle comprising a hand-grip piece formed with a perpendicular arm made with a socket-head; a tang movably held in said socket-head, such tang comprising a threaded portion and a longitudinally slotted portion the divided legs of which are joined at their lower ends by a guard extending in the direction of the saw blade and engaging simultaneously a plurality of saw teeth; said guard being made with a longitudinal channel, and a nut on the threaded portion of the tang above the sleeve.

NICHOLAS R. RASHFORD.

Witnesses:
 WM. C. SCHMITT,
 R. BRADLEY.